Feb. 15, 1949.   R. J. NADHERNY   2,461,653
VEHICLE MOUNTED SHOVEL
Filed June 13, 1946   2 Sheets-Sheet 1
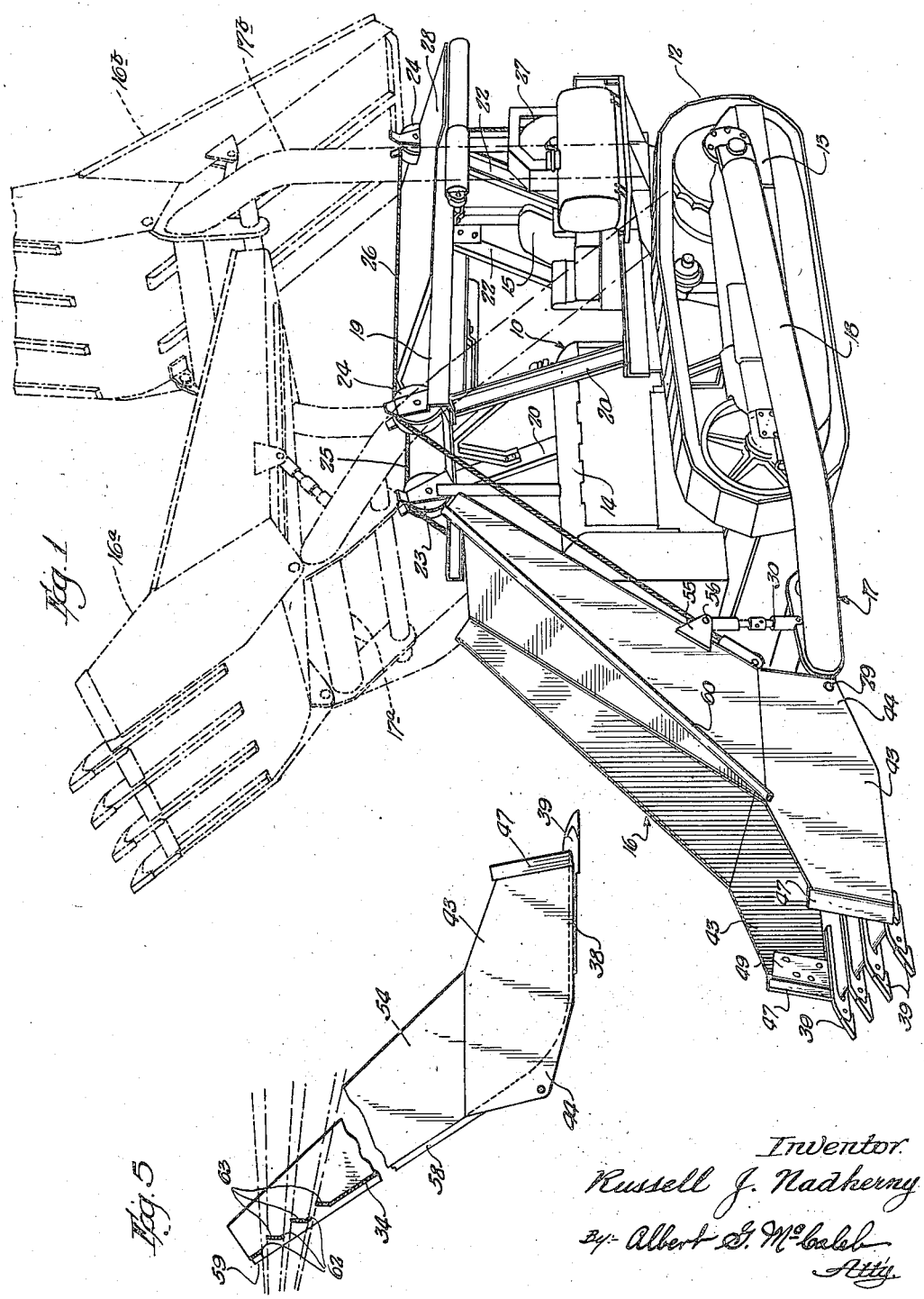
Inventor
Russell J. Nadherny
By Albert G. McCaleb
Atty.

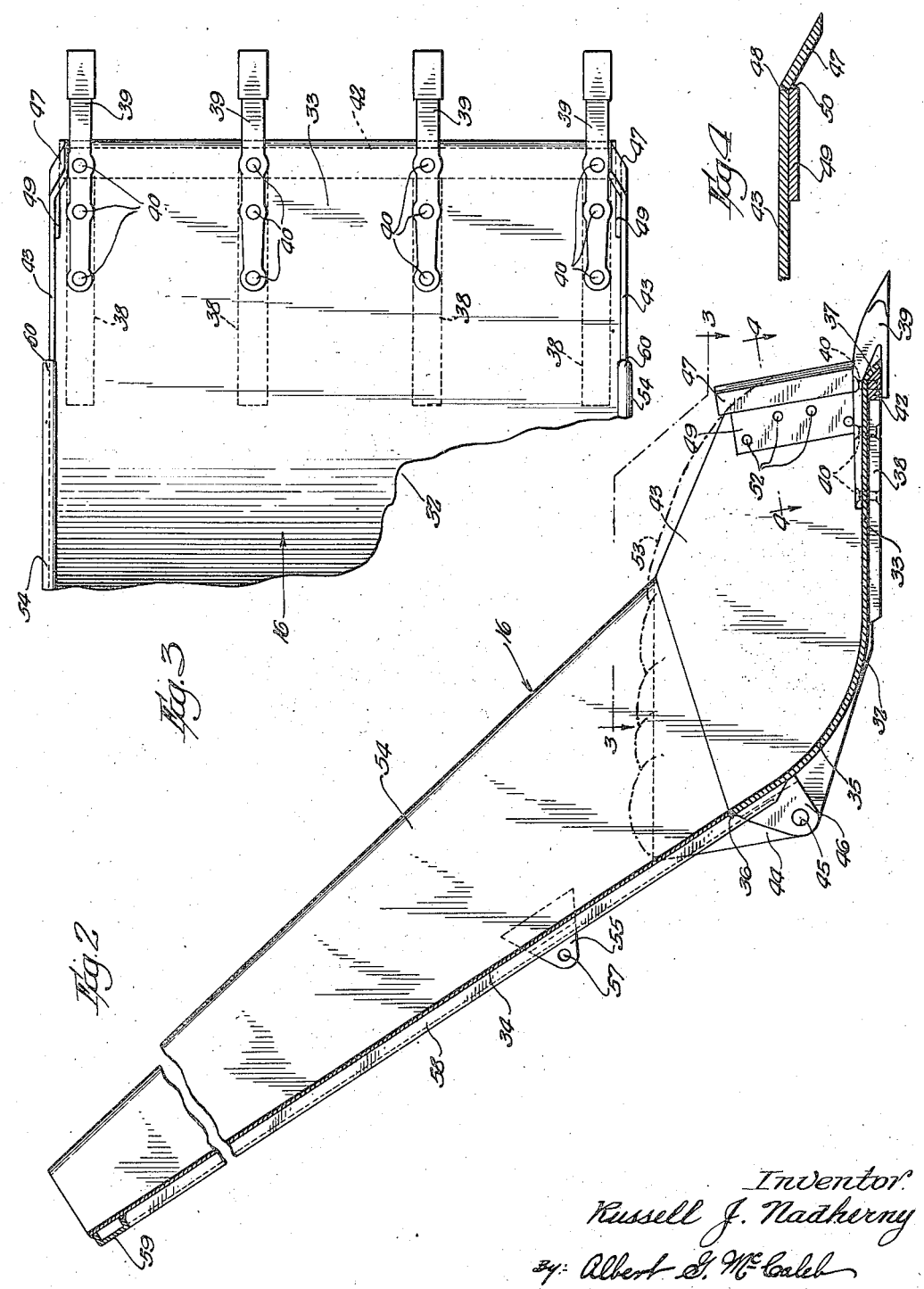

Patented Feb. 15, 1949

2,461,653

UNITED STATES PATENT OFFICE 2,461,653

VEHICLE MOUNTED SHOVEL

Russell J. Nadherny, Chicago, Ill., assignor to Athey Products Corporation, Chicago, Ill., a corporation of Illinois Application June 13, 1946, Serial No. 676,451

7 Claims. (Cl. 214—131)

This invention relates to vehicle mounted shovels and incorporates some features thereof which are quite generally applicable in the art, while others are more especially related to shovels adapted to scoop material in at one end and dump it from the other end.

One of the more general objects of my present invention is to provide a shovel for handling various kinds of material and which is designed to prevent packing of the material in the shovel to the extent that the dumping is made difficult.

It is another and quite general object of this invention to provide a shovel having substantially plane side walls through which driving force is transmitted to the shovel structure during scooping action and which act as substantially straight and rigid thrust transmitting elements.

Another object of my invention is to provide an improved shovel having cutting edges turned inwardly relative to the side walls of the shovel, so as to provide relief tending to prevent packing of material scooped into the shovel.

As another object my invention has within its purview the provision of a shovel wherein the relationship of the length of the bottom portion of the shovel is so related to the rated capacity thereof and the disposition of the back wall that the rated capacity of material scooped into the shovel can be attained and carried without compression of the material against the back wall.

My invention has for a further object the provision of an improved shovel for overhead type loaders and which not only provides an effective scoop for loading at one end and a chute for dumping at the other end, but also has an intermediate carrying position for the movement of loads of material.

For an additional object, my invention comprehends a shovel for overhead type loaders which gives improved visibility during the shovel loading operation.

Other objects and advantages of the invention will be apparent from the following description and the accompanying drawings in which similar characters of reference indicate similar parts throughout the several views.

Referring to the two sheets of drawings:

Fig. 1 is a perspective view taken from in front and to one side of a tractor upon which a preferred embodiment of my shovel is mounted for material handling and loading purposes;

Fig. 2 is a side sectional view of the shovel shown in Fig. 1;

Fig. 3 is a fragmentary top plan view of an end portion of the shovel shown in Fig. 2 viewed substantially as indicated by the line 3—3 in Fig. 2 and the accompanying arrows;

Fig. 4 is a fragmentary sectional view taken substantially on a line 4—4 of Fig. 2; and Fig. 5 is a side elevational view depicting a modification of my invention and in which a portion of the structure is cut away and a portion is shown in section.

In order to depict fully and clearly the functions and operation of an exemplary form of my shovel as well as its various operating positions, I have illustrated, in Fig. 1, its adaptation to a tractor 10 of a well known track laying type. Providing only an illustrative example for the clear and complete disclosure of my shovel and its salient features, the tractor and certain of its associated shovel-carrying structure will be only briefly described herein.

Referring to Fig. 1, the tractor 10 has tracks 12 on each side upon which it moves, and which tracks are movable relative to track frames 13 and power driven by an engine covered by a hood 14. An operator's seat is provided at 15, from which the operations of both the tractor and the shovel are controlled.

The shovel 16 and shovel-carrying structure are adapted to overhead loading wherein material is scooped into the shovel at the front of the tractor and dumped at the rear of the tractor. For transportation of the material between the loading and dumping, an intermediate carrying position is utilized.

The structure by which the shovel is carried relative to the tractor includes a yoke 17 extending across the front and along the sides of the tractor with the rear ends of its side arms 18 supported for swinging movement from the track frames 13. An overhead frame 19 is carried by front and rear trusses 20 and 22, respectively, on each side of the tractor. Desirably, the trusses are supported through suitable structure from the track frames 13. Sheaves 23 and 24 rotatably supported by the frame 19 carry cables 25 and 26 which each have an end secured to the forward end of the yoke 17 and their other ends connected to winding drums of a power driven winch 27. Power for driving the winch is taken from the tractor engine through a power take-off connection or through engine driven hydraulic means.

By the application of power to the winch, the yoke may be raised from its lower position, shown in solid lines, to an intermediate carrying position, such as that depicted in dot and dash lines at 17a, or to a rear dumping position illustrated in dot and dash lines at 17b. A canopy 28 preferably covers at least a portion of the frame 19 to prevent material from the shovel from dropping onto the operator or tractor.

By preference, the shovel 16 is rotatably connected to the forward end of the yoke 17 by pins 29 and is stabilized relative to the yoke by an adjustable link 30. In some instances, the link 30 is replaced by a mechanism permitting front dumping of the shovel contents under the control of the operator.

Referring more particularly to the structural details of the shovel 16, as depicted in Figs. 1 to 4, inclusive, it includes a bottom plate 32 which, in the present instance, comprises substantially plane end portions 33 and 34 disposed in obtuse angular relationship relative to one another and connected by a smoothly curved intermediate portion 35. For reasons such as the reduction of the weight and cost of the bottom plate 32, and in order to provide material of sufficient weight at the more heavily stressed lower end portion of the shovel, the bottom plate is made of two pieces connected along a seam 36 by means such as welding and so as to present a smooth inner surface. For use in the adaptation depicted, the plane end portion 33 at the lower end of the shovel is shorter than the plane end portion 34 which extends upwardly and rearwardly at the back of the shovel.

At its forward edge the plane end portion 33 of the bottom plate has an end flange portion 37 bent downwardly to serve as a forward cutting edge. Also, for reenforcing the plane end portion 33 a series of longitudinally extending bars 38 are secured to the lower surface thereof in laterally spaced relationship. Desirably, those bars extend rearwardly along the lower surface of the plane end portion 33 practically to the curved portion 35. A plurality of forwardly projecting digger teeth 39 are spaced laterally of the cutting edge of the shovel to correspond to the spacing of the reenforcing bars 38 and overlie the bars. Lateral reenforcement for the cutting edge of the shovel is provided by a cross bar 42 which extends across the lower surface of the plane end portion 33 of the bottom plate between the end flange portion 37 and the forward ends of the bars 38. The bars 38 and 42, as well as the digger teeth 39, are secured to the plane end portion 33 of the bottom plate by fastening means, such as rivets 40.

The side edges of the bottom plate 32 are preferably parallel throughout their length. At the lower end of the shovel, side plates 43 are secured to the opposite side edges of the bottom plate in parallel relationship to one another and extend rearwardly along those side edges from a position adjacent the forward cutting edge and so as to overlie the curved portion 35 of the bottom plate. The rear ends of the side plates 43 have integral portions 44 in the same plane as the remaining portion of each plate, which projecting portions extend outwardly to the rear of the bottom plate and provide mounting brackets having aligned openings 45 therein for receiving the pins 29 by which the shovel is connected to the yoke 17. To provide an additional bearing surface, brackets 46 are secured to the bottom plate 32 at a distance inwardly of the projecting portions 44 on the side plates and have openings therein aligned with the openings 45, also to receive the pins 29.

In the disclosed embodiment of my invention, the front ends of the side plates 43 extend upwardly from a position adjacent the forward cutting edge of the shovel and slope somewhat to the rear, as shown in Fig. 2. At the front edges of the side plates 43, side cutting plates 47 are secured thereto by means such as welded seams 48, as shown in Fig. 4, and extend forwardly therefrom; the forward edges of those side cutting plates being sharpened to improve their cutting ability. Preferably, an inner reenforcing plate 49 is secured to the inner surface of each side plate 43 by means such as rivets 52 and braces each side cutting plate 47 through a welded seam such as 50.

Although contrary to the usual practice, the side cutting plates 47 in my preferred shovel structure extend inwardly of the shovel at an obtuse angle with respect to the plane of the side plates 43 so as to have a tendency to cut the material which is scooped into the shovel at positions inside the planes of the side plates 43, thereby tending to relieve lateral pressure against the side plates of the material in the shovel. This tendency is most effective in instances where its effect is most desirable. That is, when hard or sticky material is being handled, the relief of the lateral pressure of that material against the side walls tends to prevent its packing against those side walls so as to adhere thereto and make the dumping of the shovel difficult. The usual outturned side cutting edges have the tendency to pack the material laterally within the shovel. With loose material such as gravel which flows freely within the shovel, the effect of the inturned cutting edges is less noticeable because the material flows freely from the shovel when it is dumped.

It is of further importance to the scooping of material into the shovel that the driving force is effectively applied thereto in a manner which avoids the tendency to warp or buckle any of the parts of the shovel through which it is applied. I have accomplished this result in the disclosed shovel structure by the application of the driving force through the plane and substantially parallel side plates 43. The side plates act as straight thrust members extending forwardly from the positions of force application to the cutting edges. The rigidity of the plane side plates 43 is enhanced by their combination with the reenforced and curved portions of the bottom plate. In addition to utilizing the straight side plates 43 as thrust-carrying members, the integral bracket portions 44 at the rear of those plates are sufficiently low to limit the angle of thrust from the positions of application of the driving force to the cutting edge of the bottom plate.

In addition to the use of the inturned side cutting plates to relieve the packing against the side plates of material within the shovel, I have also found that the parts of my shovel may be so proportioned as to further minimize the difficulty of filling or dumping the shovel due to the packing of material therein. A shovel is normally designed to have a rated volumetric capacity commensurate with the work that it is adapted to do and also with the size of a machine, such as the tractor in Fig. 1, upon which it is adapted to be used. In my presently disclosed shovel, the length of the plane end portion 33 of the bottom plate, the width of the bottom plate and the height of the side plates 43 are so proportioned that the full rated volumetric capacity of material may be scooped into and retained within the shovel without packing the material longitudinally against the curved intermediate portion 35 of the bottom plate. The dot and dash lines at 53 in Fig. 2 indicate a normal load of material in the shovel which may be retained without the packing of the material against the inner shovel surfaces. In the process of scooping such a load into the shovel, the material slides along the bottom plate and turns upwardly at the curved portion. During the progress of the material upwardly at the curved portion, it falls forwardly and rolls into the loaded portion without material compression. One advantage attributable to the rolling action of the material is that the shovel may be readily filled in a single pass. Additionally, with the load thus held without its being packed, it falls away easily from the bottom plate when tipped to an angle for dumping either forwardly or rearwardly.

In order to adapt my shovel for dumping at its rearward end as well as at the forward end and to provide an intermediate carrying position in which a load of material may be transported while in the shovel, particularly for adaptations such as that illustrated in Fig. 1, I have provided side wall extension plates 54 which have their edges secured to the side edges of the plane end portion 34 of the bottom plate. The side wall extension plates desirably have triangular end portions which overlap and closely fit against the inner surfaces of the side plates 43. The side extension plates 54, together with the plane end portion 34 of the bottom plate, adapt the shovel to the retention of material for transportation when it is raised to an elevated intermediate position such as that indicated in dot and dash lines at 16a in Fig. 1, and provide a chute through which the material is dumped from the shovel when raised to a dumping position such as that indicated in dot and dash lines at 16b in Fig. 1.

In order to provide a shovel from which the material will not spill over the sides in any of its various positions of use and to avoid the additional weight of excess material in the side walls, I have found it desirable that the height of the side walls formed by the side plates 43 and the side wall extension plates 54, as measured in directions perpendicular to the various portions of the bottom plate, may taper downwardly at the ends, and is maximum near the curved intermediate portion of the bottom plate.

Side plates 55 are secured by means such as welding to opposite outer faces of the side extension plates 54 and project rearwardly from the plane end portion 34 of the bottom plate for use as attachment or angle brackets. Additional to and spaced from the integral side plate extensions 44 in the installation depicted in Fig. 1, adjustable links 30 each have one end connected to the side plates 55 by means such as pins 56 which extend through openings 57 in the side plates.

To strengthen and rigidify the chute portion of the shovel, including the plane end portion 34 of the bottom plate, longitudinally extending and laterally spaced channel members 58 are secured to the lower surface thereof. At the upper end of the plane end portion 34 a laterally extending channel 59 is secured to the outer surface thereof to effect lateral rigidity. In order to improve the rigidity and stability of the side wall extensions 54, I prefer to provide rolled upper edges 60 thereon, as indicated in Figs. 1 and 3.

In the modification of my invention, which is illustrated in Fig. 5, the general structure of the shovel is similar to that illustrated and described with respect to Figs. 1 to 4, inclusive, and similar reference numerals have been applied to Fig. 5 to designate like parts. However, in the form shown in Fig. 5, a series of lateral slots 62 is provided in the plane end portion 34 of the bottom plate at an elevation such that they are aligned between the operator's position and the material which is being shoveled so as to serve as sight openings which enable the operator better to observe the loading operation of the shovel. Louvers 63, which are preferably formed integrally with the plane end portion 34 of the bottom plate, partially cover the slots 62 and project angularly from the bottom plate in directions such that the material will slide across the slots on the louvers when the shovel is dumped rearwardly through the chute portion.

From the foregoing description, it may be readily understood that the disclosed shovel structure provides strength and rigidity without excessive weight, and has parts so constructed, proportioned and arranged that it is well suited to shoveling and handling of various kinds and types of materials. The prevention of the packing of material within the shovel when it is loaded facilitates the dumping of the material from either the front or rear ends of the shovel. In its intermediate position the shovel is well adapted to the transportation of material by movement of the machine upon which the shovel is mounted. Furthermore, with the addition of the louvered sight openings shown in Fig. 5, the operator is enabled to observe the work being done by a shovel having an attached chute for rear dumping.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A shovel for use on an overhead type of loader such that material is scooped in at one end, carried in an intermediate position and dumped from the opposite end and comprising, in combination, a bottom plate having substantially planar end portions disposed in obtuse angular relationship and connected by a smoothly curved intermediate portion, substantially flat side plates secured to opposite side edges of the bottom plate and extending rearwardly from one end of the bottom plate to the curved intermediate portion thereof, said side plates having integral portions extending rearwardly beyond the curved intermediate portion to provide thrust brackets through which driving force is applied to the shovel, means secured to the end of the bottom plate to provide a forward cutting edge, side cutting plates secured to the ends of the side plates adjacent the forward cutting edge, said side cutting plates being disposed in obtuse angular relationship with respect to the planes of the side plates and projecting inwardly of the shovel so as to tend to relieve pressure of material scooped into the forward end, and additional side plates secured to opposite sides of the bottom plate, said additional side plates adjoining the first mentioned side plates and extending to the rearward end of the bottom plate to provide a chute for dumping material from the shovel.

2. A shovel for use on an overhead type of loader such that material is scooped in at one end, carried in an intermediate position and dumped from the opposite end and comprising, in combination, a bottom plate having substantially planar end portions disposed in obtuse angular relationship and connected by a smoothly curved intermediate portion, said end portions being of different lengths, substantially flat side plates secured to opposite sides of the shorter of said end portions in substantially parallel relationship to one another and extending rearwardly along said shorter end portion of the bottom plate to the curved intermediate portion, means secured to the end of the bottom plate between said side plates to provide a forward cutting edge, means providing cutting edges on the forward ends of said side plates extending upwardly from the bottom plate near said forward cutting edge, said side cutting edges being disposed inwardly of the shovel from the inner surfaces of the side plates so as to tend to relieve pressure against the side plates of material scooped into the shovel at the forward end, the length of said shorter end portion of the bottom plate and the height of said side plates from the bottom plate being such that the rated volumetric capacity of the shovel can be scooped into the shovel and retained therein without packing the material against said curved intermediate portion of the bottom plate, and additional side plates secured to opposite sides of the longer end portion of the bottom plate to provide a chute for dumping material from the shovel, and the angular dispositions of the end portions of the bottom plate to one another being such that when the chute slopes downwardly for dumping, the material falls away from the shorter end portion.

3. A shovel for use on an overhead type of loader such that material is scooped in at one end, carried in an intermediate position and dumped from the opposite end and comprising, in combination, a bottom plate having substantially planar end portions disposed in obtuse angular relationship and connected by a smoothly curved intermediate portion, said end portions being of different lengths, substantially flat side plates secured to opposite sides of the shorter of said end portions in substantially parallel relationship to one another and extending rearwardly along said shorter end portion of the bottom plate to the curved intermediate portion, means secured to the end of the bottom plate between said side plates to provide a forward cutting edge, means providing cutting edges on the forward ends of said side plates extending upwardly from the bottom plate near said forward cutting edge, the length of said shorter end portion of the bottom plate and the height of said side plates from the bottom plate being such that the rated volumetric capacity of the shovel can be scooped into the shovel and retained therein without packing the material against said curved intermediate portion of the bottom plate, and additional side plates secured to opposite sides of the longer end portion of the bottom plate to provide a chute for dumping material from the shovel, said side plates together forming side walls having heights which, when measured in directions perpendicular to the bottom plate, increase from each end toward the portions thereof adjacent the curved intermediate portion of the bottom plate.

4. A shovel adapted to be mounted for use on the front end of a tractor and comprising, in combination, a scoop portion at one end having a forward cutting edge and a chute portion at the other end, each of said portions having bottom and side walls which together form a continuous trough-like structure having open ends, the bottom walls of said scoop and chute portions being disposed in obtuse angular relationship to one another so that when the bottom wall of the scoop portion rests against the ground at the front of the tractor with its said cutting edge forward the chute portion projects upwardly and toward the tractor, a series of horizontally disposed slots in the bottom wall of the chute portion providing sight openings for the operator, and louvers on the bottom wall of the chute portion partially covering said slots and being angularly disposed relative to the bottom wall so that material from the scoop portion will slide across the slots.

5. In a shovel, the combination comprising a bottom plate having side edges and a front digging edge, side walls extending upwardly from the side edges of the bottom plate, said side walls having upwardly extending front edges near the digging edge of the bottom plate, and side cutting plates secured to the front edges of the side walls and extending inwardly thereof in obtuse angular relationship to the plane of the side walls so as to tend to relieve the pressure against the side walls of material scooped into the shovel between the side cutting plates.

6. In a shovel, the combination comprising a bottom plate having side edges and a front digging edge, substantially flat side plates secured to the bottom plate and extending upwardly therefrom in substantially parallel relationship to one another, means providing cutting edges at the forward ends of the side plates, and extensions at the rear of the side plates providing brackets through which driving force is transmitted to the cutting and digging edges of the shovel.

7. In a shovel, the combination comprising a scoop portion having a front digging edge, and a chute portion at the rear of the scoop portion through which material is dumped from the scoop portion, and said chute portion having a series of louvered slots therein over which material is dumped and which provide sight openings through which the filling operation of the scoop portion may be observed, said slots extending in a direction lateral to the direction of flow of material from the scoop portion through the chute and being louvered internally of the scoop portion to minimize the loss of materials through the slots during dumping.

RUSSELL J. NADHERNY.

REFERENCES CITED

The following references are of record in the file of this patent:

UNITED STATES PATENTS

| Number | Name | Date |
| --- | --- | --- |
| 1,340,247 | Petersen | May 18, 1920 |
| 1,456,043 | Smith | May 22, 1923 |
| 1,611,860 | Richey | Dec. 21, 1926 |
| 2,239,288 | Garner | Apr. 22, 1941 |
| 2,272,648 | Smith | Feb. 10, 1942 |
| 2,269,917 | Repplinger | Jan. 13, 1942 |